United States Patent [19]
Ahm

[11] Patent Number: 5,101,594
[45] Date of Patent: * Apr. 7, 1992

[54] TAPE OR PACKAGED TAPE PROVIDED ALONG THE LENGTH THEREOF WITH POCKETS CONTAINING VIABLE PLANT MATERIAL AS WELL AS A PROCESS FOR PRODUCING THE TAPE

[75] Inventor: Poul H. Ahm, Las Palmas, Spain

[73] Assignee: Bentle Products AG, Zug, Switzerland

[*] Notice: The portion of the term of this patent subsequent to Mar. 27, 2007 has been disclaimed.

[21] Appl. No.: 298,181

[22] Filed: Jan. 17, 1989

Related U.S. Application Data

[63] Continuation-in-part of Ser. No. 796,861, Nov. 12, 1985, abandoned.

[51] Int. Cl.⁵ .............................. A01G 9/10; A01C 1/04
[52] U.S. Cl. .............................................. 47/56; 47/73
[58] Field of Search ........................ 47/56, 73, 78, 64

[56] References Cited

U.S. PATENT DOCUMENTS

| | | | |
|---|---|---|---|
| 3,172,234 | 3/1965 | Eavis | 47/56 |
| 4,329,812 | 5/1982 | Carlisle | 47/73 |
| 4,789,584 | 12/1988 | Perrin | 47/64 |

FOREIGN PATENT DOCUMENTS

| | | | |
|---|---|---|---|
| 668757 | 3/1952 | United Kingdom | 47/73 |
| 1436264 | 5/1976 | United Kingdom | 47/56 |

*Primary Examiner*—Richard E. Chilcot, Jr.
*Assistant Examiner*—Michele A. Van Patten
*Attorney, Agent, or Firm*—Cooper & Dunham

[57] ABSTRACT

In a tape or packaged tape provided along the length thereof with pockets disposed transversely to the tape and with a desired spacing, said pockets are containing viable plant material such as seeds, other kinds of sproutable germs, cuttings, meristems, or tissure culture fixed thereto and intended for development into seedlings or bedding plants within the packaged tape before being transplanted as a continuous tape. The pockets comprise two wall-forming layers being fixed to each other at intervals and being adapted to enable the necessary supply and regulation of air and water for the development of the plant material inside the tape without the coexistence of any further growth medium thereabout. One of the layers prevents the roots of the plants from penetrating through said layer, and one of the layers is adapted to allow the roots to penetrate into or adhere to said layer, thereby securing the plants inside the pockets. The pockets are open at the top and bottom thereof. The tape including the pockets and the viable plant material is quite flat and bendable, windable spirally and foldable flat upon itself into a package. The tensile strength of the tape is at least one Newton.

In producing the tape, the viable plant material is inserted between the two wall-forming layers forming the tape and the pockets and fixed thereto. The two layers are fixed to each other about the plant material, and the tape is wound or folded upon itself into a package of tape.

In this manner there is constructed a continuous tape allowing the rational and inexpensive production of plants of a uniform, high quality, said tape in addition being suited for a direct, mechanical transplantation on the growing habitat.

20 Claims, 3 Drawing Sheets

TAPE OR PACKAGED TAPE PROVIDED ALONG THE LENGTH THEREOF WITH POCKETS CONTAINING VIABLE PLANT MATERIAL AS WELL AS A PROCESS FOR PRODUCING THE TAPE

This application is a continuation-in-part of application Ser. No. 796,861 filed Nov. 12, 1985 now abandoned.

FIELD OF THE INVENTION

The invention relates to a rape or packaged tape provided along the length thereof with pockets disposed transversely to the tape and with a desired spacing, said pockets containing viable plant material selected from the group consisting of seeds, other kinds of sproutable germs, cuttings, meristems, and tissue culture, said plant material being fixed thereto and intended for development into seedlings or beddingplants within the packaged tape before being transplanted as a continuous tape.

When growing gardening, forestry, and agricultural products of the kind where it is usually desired that the plants are placed with a specific mutual spacing on the habitat and harvested after a shorter or longer period, the technique used has been developed during the years in order to reduce the working costs in connection with the growing and in order to increase and improve the yield. Beyond the more general measures in this connection — such as carrying out a suitable preparation and processing of the soil or the growth medium, a suitable selection of the seed or plant material, and a suitable care of the crop through fertilizers, optional watering, combating of disease and weed, as well as parallel thereto an increasing mechanization of the working processes — intensive efforts have been made during recent years to ensure an optimum development of the plants in the first phase of their growing period. The latter has partly been performed by purpose-treating the seed or plant material and partly by a more controlled initial development in purpose-packings of seedlings or plants designed to be transplanted later on one by one on the habitat. These previously known producers and processes have, however, involved relatively labour-requiring and consequently expensive methods or packings having been relatively expensive and/or material-consuming. Thus it has only been possible to obtain savings compared to those earlier production methods that are being very labour-requiring and/or very uncertain as to the growth.

BACKGROUND ART

One of the more significant improvements during recent years has been the germinator described in Danish patent application No. 1733/81. This germinator comprises a plastic cover about a hygroscopic textile in contact with a seed, a seedling or a plant cutting. Such germinators may be produced in coherent lengths and are intended for being transplanted on the permanent habitat after a controlled germination and/or growth of the plant material in a moist layer of sand after separation from the main length by cutting or tearing off. Then the plastic cover protects the roots of the plant against drying out during the period immediately following transplantation, and the roots of the plants and the plastic covers are upon the transplantation in contact with a constantly moist layer of soil, whereby a maximum of completely developed plants is obtained. In using said germinator, which is industrially producable, it is possible to ensure a high percentage of plants capable of surviving on the habitat.

It is furthermore known from GB-PS No. 1,041,133 to have a seed pack in which the seeds are encapsulated in a similar manner in pockets in a tape formed by localized adherence of two layers of material such as for instance paper, textiles, plastic film or the like materials, and where the tape is rolled up or folded into a pack. The material is stated to possess a strength sufficient for keeping together the pack after having been completely moistened and during the germination and development of the seeds in the pack into plants ready for transplantation. Subsequently, the pack is opened and the plants are removed and transplanted one by one into the soil or a similar growth medium. It is furthermore known that the layers of material are of such a nature that the roots of the plants do not stick thereto so that the plants can be removed from the tape without damaging said roots.

SUMMARY OF THE INVENTION

The object of the invention is to provide a tape or a packaged tape of the king stated above and which is inexpensive to manufacture, and which allows a hitherto unsurpassed efficient, and mechanized control of the production of the tape and of the germination and forcing of the plants contained in the tape, as well as of the transport and placing or transplanting of the plants on the permanent habitat while simultaneously ensuring a high percentage of usable plants.

The tape or packaged tape according to the invention is characterized in that the pockets comprise a first thin layer and a second thin layer of wall-forming materials being fixed to each other at intervals, and wherein said walls of the pockets are adapted to enable the necessary supply and regulation of air and water for the development of the plant material inside the tape without the coexistence of any further growth medium thereabout, at least one of the layers being adapted to prevent the roots of the plants from penetrating through said layer upon the development of said plant material, and at least one of the layers being adapted to secure the plants inside the pockets by allowing the roots to penetrate into or adhere to said layer, said pockets further being open at the top and bottom thereof, the tape including the pockets and the viable plant material being quite flat and bendable, windable spirally and foldable flat upon itself into a package, the tape in the longitudinal direction further having a tensile strength of at least 1,5 Newton, leaving a tensile strength of at least one Newton at the time of transplantation, enabling it to stand a mechanical treatment including a fully automatic transplantation of the tape by pulling it out from a spirally wound or folded package and leading it down into the soil.

The nature and the shape of the materials used for the tape and the shape of the tape itself with a small material thickness without and particular growth medium inbetween or around it render it possible to produce the tape at an unusually low unit price or price per plant compared to the previously known systems. As the tape furthermore is windable or foldable, and as the pockets are open to the top and the bottom, it is thereby rendered possible for the plants to grow beyond the edges of the tape with the effect that a very high number of plants can be stored and developed inside the packaged tape at a small area. Consequently it is inexpensive to store and transport the tapes and plant materials as well as to provide facilities for a suitably controlled germination growth additionally facilitated by the capability of the material of enabling a supply and adjustment of the required quantity of air and water. Furthermore the strength of the tape and the position at a predetermined mutual spacing of the pockets on the tape as well as their securing initially of the viable plant material and subsequently also of the plants, preferably without allowing the roots of the plants to penetrate through at least one of the pocket walls, will always make the tape suited for mechanical, optionally fully automatic handling including transplanting the tape on the permanent habitat for the plants without damaging the tape nor the plants as said plants are protected by the pockets.

The tape may be shaped in many different ways. The preferred embodiment of the tape comprises a length of tape material forming the first of said two thin layers of the pockets containing the plants, said length having the desired tensile strength of the tape and preventing the roots of the plants from penetrating therethrough, the second layer of said pockets being fixed to said first layer and being formed as strips of a material penetrable to the roots of the plants.

In another embodiment the tape comprises two lengths of tape material being fixed to each other with a desired spacing along the length thereof to provide the said pockets. This embodiment is of specific interest in case of plant material to be transplanted close to each other in a row such as carrots and radishes.

Alternatively the pockets of the tape may be produced individually by one or more materials and subsequently transferred to one or more separate elongated supporting members, such as tapes or strings, to which the pockets are adhered, or tapes with securing means of varying types for the pockets. The two layers of the pockets may be fixed to each other in a manner known per se, such as for instance by adhering, melting together, crimping or pleating, and the inserted viable plant material can be adhered to at least one of the layers of the pocket.

The materials for the tape and the pockets are preferably selected from the group consisting of plastic film, paper, paper coated on one side thereof with a plastic membrane, paper coated on one side thereof with a wax, a fiber-reinforced material, a fiber-reinforced paper coated on one side thereof with a was, a non-woven material, a non-woven material coated one side thereof with a plastic membrane, a non-woven material coated one side thereof with a wax, a layer of foamed synthetic resin coated on one side thereof with a plastic membrane, a layer of foamed synthetic resin coated on one side thereof with a wax, and a combination of said materials. The materials are considered the most applicably for the purpose. However, other materials can be used for the walls of the pockets as well as for the tape and the above elongated supporting members of the tape.

When packaged and incorporating the developed seedlings or beddingplants ready for transplantation, the tapes facilitate the transplanting to a hitherto unsurpassed degree whether it is carried out manually, semi-automatically or fully automatically, as none of said procedures necessitate a handling of each pocket or plant separately like in the systems hitherto used. Furthermore an exact and uniform placing of the plants is ensured in a simple manner both mutually and relative to the growth medium. The tape idea according to the invention as described above renders it possible to fully automate the transplanting with a unique and advantageous result nor yet previously obtainable.

Combinations of materials for the tape having shown excellent results are found in a tape, wherein the material of the first thin layer of the pockets is a paper coated on one side (the outer side) thereof with a plastic membrane, and the second thin layer of the pockets is a porous paper, and a tape, wherein the material of the first thin layer of the pockets is a fiber-reinforced paper coated on one side (the outer side) thereof with a wax layer, and the second thin layer of the pockets is a porous paper. A further advantage is according to the invention obtained by a tape wherein the wax layer is a layer of small balls of wax, said layer being water-retaining though permeable to aqueous vapor and air, the latter combination providing excellent growing conditions for the roots.

The ability of the roots to grow into the top layer of the soil upon the transplantation may be enhanced by using a tape, wherein the strips of the second layer of the pockets are fixed to the first layer of the pockets along one of their side edges transversely to the tape direction only, said pockets thereby being open to the other side and to the top and the bottom of the pocket. Such a tape is particularly advantageous in connection with some kinds of plants, especially plants having a thin radicle and a voluminous top of the plant, such as for instance lettuce plants.

Simply because the tape is suited for fully automated handling and transplanting with the industrially forced plants ready for transplantation, completely new possibilities of a rational planting of great areas with uniform growth-ensured plants are obtained while involving a minimum of labour and materials. The technique used — by which the handling of the single plants separately is replaced by the handling of the tape — renders it furthermore possible to carry out the transplanting as early as at the seed leaf stage of the plants or even before that stage, the plants in both stages being far more resistant to weather changes than larger setting plants with developed foliage leaves. Thus a greater security for healty plants with the greatest possible yielding capacity is simultaneously obtained. Finally it is now possible to obtain an essentially improved utilization of the growth period in the fields for a series of crops not previously allowing a transplanting of pre-cultured plants in an economically justifiable manner. The latter can either lead to an earlier harvest or to an extension of the entire growth period or to both, thereby resulting in a higher yield.

Furthermore a nearly 100% efficient utilization both of the area for the permanent habitat of the plants and consequently of the substances added to the area such as fertilizers, water, and spray substances may be obtained when using a tape wherein additional replacement pockets containing plants are affixed to the tape close to pockets without plants and pockets containing unsatisfactory or destroyed plants. The additional pockets are disposed within a distance of 40% of the plant spacing, preferably within a distance of 20% of said spacing from the pockets to be compensated for. As a result an optimum uniformity of the plants in the tape as well as on the permanent habitat is, of course, also obtained. Alle these features provide an increased area yield and a better utilization of the capital and labour invested. In addition a better basis is provided for a simultaneously automatic harvesting of the regularly placed and uniform plants, all resulting in a better end product.

The additional pockets may advantageously be fixed to the tape by means of an adhesive, preferably by means of a wax layer or a plastic coating of the tape itself. However, other means can also be used for the fixing, for instance staples and die stamping.

In order to facilitate a sorting out of unsuited plants and to ensure a correct replacement of pockets in the tape, the walls of said tape may comprise at least in part translucent material or at least in part transparent material. In this manner it is rendered possible to control for instance a tape with germinated or partly germinated seeds, because merely by radiation it is possible to detect and register the appearance of the plant material and the length and optionally the appearance of the root of the seedling or beddingplant developed within the tape. In addition it is rendered possible to utilize the registration as a measurement of the suitability of the plant. In this manner it is possible to perform the control of each plant and to sort out unsuited plants at a time where they have not yet reached the state ready for transplantation. This provides a longer period for performing the sorting and means that the sorting can be performed at a stage of the development of the plant where the risk of damages is reduced. Naturally, it is possible, if desired, to repeat the sorting several times.

A particularly profitable embodiment of the tape according to the invention is provided by the pockets extending all the way between opposing edges of the tape, and by the dimensions of the individual pockets having been adapted to each species of seedlings or beddingplants, among other things in such a way that the length of the pockets transverse to the longitudinal direction of the tape preferably is of approximately the same magnitude as the total expected length of the seedling or beddingplant when ready for transplantation. In this manner favourable growing conditions are provided for each plant in the tape irrespective of the species of the plant. Furthermore it is ensured that during the entire period up to some time after the transplantation, the plant is well protected against unfortunate external influences both during the handling of the tape and upon the transplantation thereof.

The above protection of the plants is furthermore ensured and additionally extended by the pocket being a carrier for the roots of the plants and/or for auxiliary additives such as fungicides, insecticides, and growth-regulating additives, such as hormones, pH-regulators, and fertilizers. As a result, an increase in or intensifying of the growth can simultaneously be obtained.

For various purposes it is profitable and advantageous when the tensile strength of the tape in the longitudinal direction of the tape before the development of the plants inside the tape is at least 1.5 Newton, thereby leaving a tensile strength of the tape at the time of the transplantation of at least 1 Newton, preferably at least 5 Newton, and especially 10 Newton. In this manner it is ensured that the tape possesses a strength sufficient for overcoming the loads usually arising during the automatic handling, especially during a fully automated sorting and transplanting without thereby involving a bursting of the tape.

A further advantage is obtained by the tape according to the invention comprising end sections of a length of at least 1,0 m, preferably at least 1.5 m without any pockets therein, as the packaged tape then always is surroundable by a layer of tape without any pockets therein. In this manner all the developed plants are protected against a drying out.

The invention related furthermore to process for producing a packaged tape provided along the length thereof with pockets disposed transversely to the tape and with a desired spacing, said pockets containing viable plant materials selected from the group consisting of seeds, other kinds of sproutable germs, cuttings, meristems, and tissue culture, and said plant material being fixed thereto and intended for development into seedlings or beddingplants within the packaged tape before being transplanted as a continuous tape. This process comprises insertion of the viable plant material at the desired spacing between two layers of wall-forming materials intended for the formation of the rape and the pockets, thereby fixing the viable plant material onto at least one of said two layers, fixing of said two layer to each other transversely to the tape and at the desired spacing, thereby forming said pockets about the viable plant material, and winding up or folding upon itself of said tape into a package of tape. Such a process ensures that the handling of each plant or plant material is restricted to its initial placing in the tape, because during the remaining stages and the following transplantation only the tape is to be handled.

The process may furthermore be carried out manually or to a hitherto unsurpassed degree semi-automacially or fully automatically while employing a consistent industrialized control of the individual stages of the process. Such a procedure ensures very low costs per unit and a maximum germination and growth of the plant material used, and at the same time it produces uniform plants as well as allows an accurate planning as to when the plants are ready for transplantation. When seeds or other kinds of plant germs are used as starting material, it is possible and profitable to transplant the tape when the plants have reached the seed leaf stage. The seedlings are more resistant to weather changes than plants with developed foliage leaves. Because of the latter feature and the very low consumption of material per plant it is also economically advantageous and possible in practise to carry out the germination and growth of the plants at a central place and subsequently to send the tapes ready for transplantation over great distances, optionally by air.

The first thin layer of wall-forming material is preferably made of a continuous length of material at the same time forming the tape length, and the second thin layer of wall-forming material is in the form of strips, each strip forming the second wall of a pocket. In this connection the material for the first layer may advantageously be selected as a paper coated on one side thereof with a plastic membrane, and the material for the second wall-forming layer may advantageously be selected as strips of porous paper, whereby the first layer provides the tape with the tensile strength and prevents the roots from penetrating through said layer simultaneously with being impermeable to water, whereas the second layer is easily penetrable to the roots and possesses a substantial water-holding capacity.

In another embodiment of the invention the tape is constructed by the use of two continuous lengths at the same time forming the walls of the pockets. In some cases, especially when a tape is to be produced with a long spacing between the pockets, a tape is first produced wherein the pockets are disposed close to each other in the tape, whereupon said tape is cut into single pockets. These pockets are subsequently transferred and affixed an additional supporting member with the desired greater spacing, whereby a new tape is formed which is rolled up or folded upon itself into a package. In this manner it is possible to economize on the material used for the pockets.

The process may according to the invention further comprise an inspection of said tape for pockets lacking plant material or containing a destroyed plant material, and fixing of additional pockets containing viable plant material on the outside of the tape close to said pockets, thereby ensuring a perfect tape.

Though the tape may be made of a variety of different materials, the process is preferably carried out with materials selected from the group consisting of plastic film, paper, paper coated on one side thereof with a plastic membrane, paper coated on one side thereof with a plastic fiber-reinforced material, a fiber-reinforced paper coated on one side thereof with a wax, a non-woven material, a non-woven material coated on one side thereof with a plastic with a wax, a layer of foamed synthetic resin coated on one side thereof with a plastic membrane, a layer of foamed synthetic resin coated on one side thereof with a wax, and a combination of said materials.

BRIEF DESCRIPTION OF THE DRAWING

The invention is described below by means of some embodiments and with reference to the accompanying drawing, in which.

DESCRIPTION OF PREFERRED EMBODIMENTS

Figure 1:
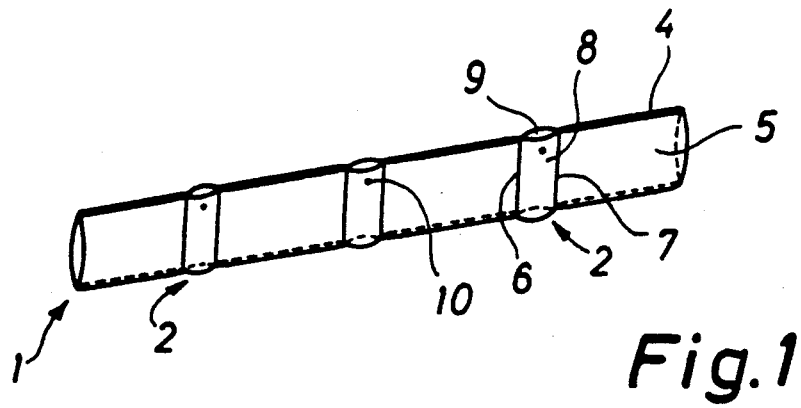
FIG. 1 illustrates a first embodiment of a tape according to the invention with inserted viable plant material, FIG. 2 a packaged tape of the tape of FIG. 1, FIG. 3 an alternative embodiment of the tape of the invention with inserted viable plant material, FIG. 4 the tape of FIG. 3 with an additional pocket.

FIG. 1 illustrates a tape 1 containing pockets 2 with seeds 10. The tape comprises two parallel lengths of material 4, 5 interconnected along joining lines 6, 7 on their respective side of the seeds 10. Thus the resulting flat pockets 2 comprise two opposing walls 8, 9, joined at the sides, but with open top and bottom. In the drawing the thickness of the pockets and the tape has been exaggerated for the sake of clarity. In practise the tape is, however, completely flat merely with a slight bulging in the pockets solely determined by the thickness of the seeds. For the sake of clarity the seeds appear through the material length 5, but in practise the material lengths 4, 5 need not be transparent. The tape is bendable and windable or foldable and possesses a strength in the longitudinal direction of more then 1 Newton in such a manner that it is suited for advancing on machinery.

Figure 2:
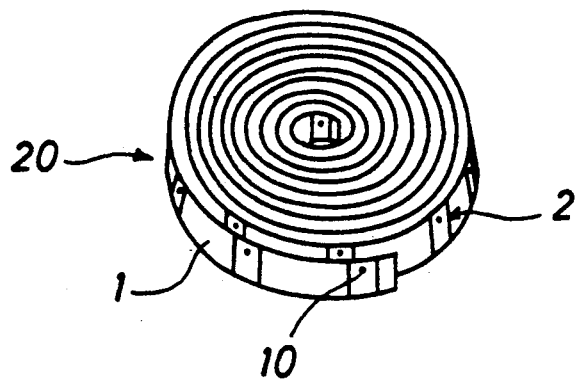

FIG. 2 illustrates a packaged tape 20 in a spirallywound packed form of a tape 1 as illustrated in FIG. 1. As an alternative, the tape 1 can be folded into a zigzag form. The material of the tape 1 of this packaged tape comprises two thin paper lengths coated on the outside (one side thereof) with a thin plastic membrane. The membrane provides a protection for the plants by reducing the evaporation from the tape upon the transplantation as well as it prevents the roots of the plants from penetrating through the side walls 8, 9 of the pockets. Finally the membrane assists in increasing the strength of the tape.

Figure 3:
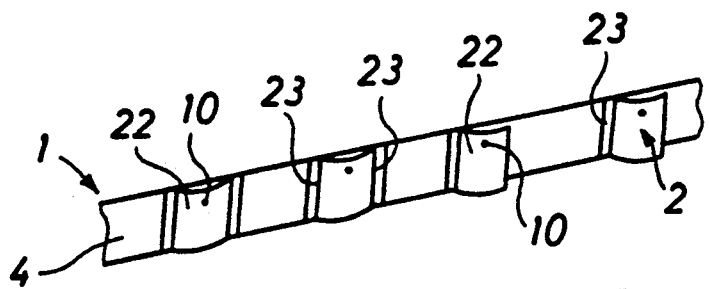

FIG. 3 illustrates a second embodiment of the tape 1 with seeds 10. The tape comprises a single material length 4 to which the seeds 10 adhere at a predetermined spacing, and whereby the pockets 2 are formed by the material length 4 and strips of material 22 joined therewith so as to overlay the seeds 10. The joining procedure has been performed in stripes 23 transverse to the longitudinal direction of the tape in such a manner that the pockets 2 are open at the side edges of the tape in the same manner as illustrated in FIG. 1. FIG. 3 shows two ways of joining the strips 22 with the material length 4. The strips 22 may be joined with the material length 4 in stripes 23 at both sides of the pockets 2, cf. the two left-hand pockets of the tape of FIG. 3 or alternatively the strips 22 may be joined with the material length 4 in stripes 23 only at one side of the pockets 2, cf. the two right-hand pockets of the tape of FIG. 3, thereby leaving the pockets open to the other side thereof in addition to the top and bottom side thereof. The strips of material 22 may be of the same material as the length 4 or of a different material.

Figure 4:
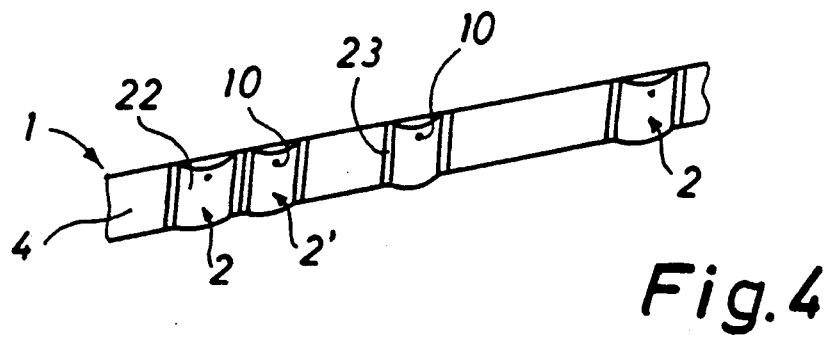

FIG. 4 illustrates a further embodiment of the tape 1 containing seeds 10, in which an additional pocket 2' containing a seed 10 is fixed to the tape 1 close to an original pocket 2 containing no seed. The additional pocket 2' can be affixed to the tape by means of an adhesive, for instance by means of a wax layer or a plastic layer on the tape itself, said layer being softened and made sticky by a heating process before the adherence. The affixing of the additional pocket 2' can also be effected by means of staples or by crimping or diestamping the pockets onto the tape.

Figure 5:
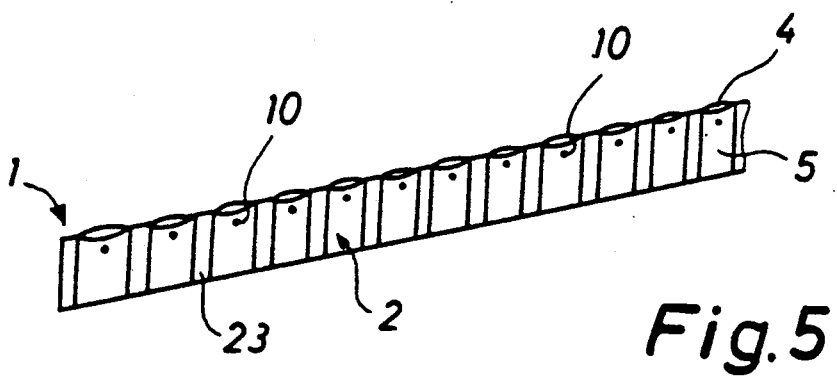
FIG. 5 and 6 illustrate alternative embodiments of the tape according to the invention, FIG. 6 with an auxiliary tape.

FIG. 5 illustrates a further embodiment of the tape 1 containing seeds 10. As in FIG. 1 the tape comprises two lengths 4, 5 of material interconnected in relatively close, relatively broad stripes 23 transverse to the longitudinal direction of the tape in such a manner that adjacent pockets 2 are formed in the tape.

Figure 6:
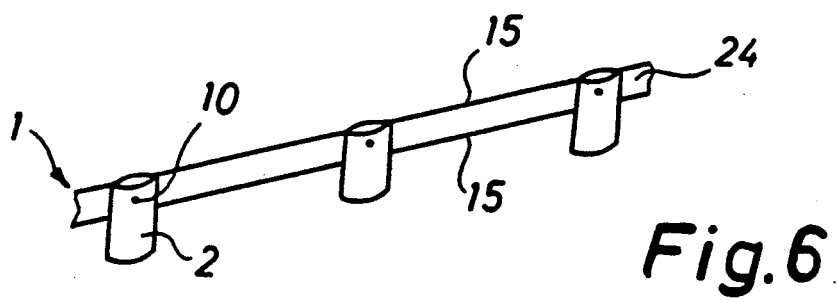

FIG. 6 illustrates yet another embodiment of the tape 1, whereby pockets 2 of the king for instance shown in FIG. 5 have been placed at a desired mutual spacing on an auxiliary tape 24 forming an elongated supporting member. The auxiliary tape 24 of FIG. 6 is shaped as a relatively narrow tape whereas it also may be of a width corresponding to the dimension of the pockets in the direction across the tape 24. As an alternative the auxiliary tape 24 comprises one or several strings for instance placed on sites corresponding to the position of the side edges 15 shown in FIG. 6 of the auxiliary tape 24 illustrated therein.

Figure 7:
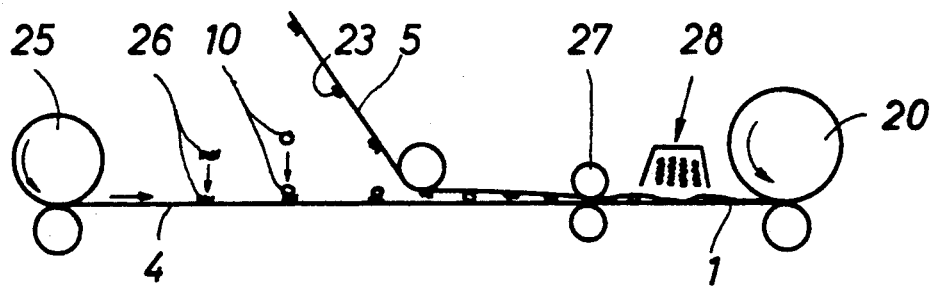
FIGS. 7 and 8 illustrate alternative processes for producing the tape and the packaged tape.
Figure 8:
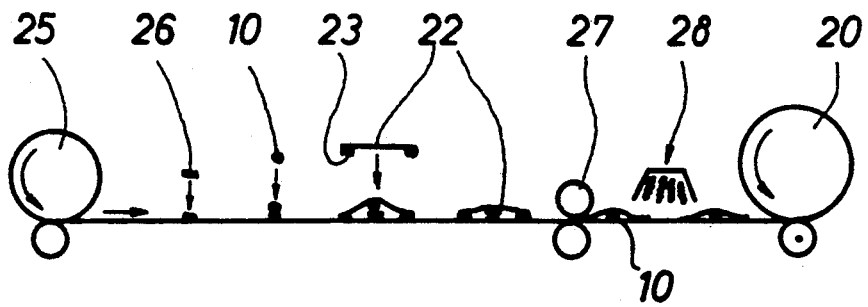

FIGS. 7 and 8 are diagrammatic view of processes for producing the tape and packaged tape. FIG. 7 illustrates a process, whereby the starting material is two lengths 4, 5 of material and the plant material is seeds 10. By this process a material length 4 is unwound from a roll 25 of material and advanced on a horizontal plane. On the top side of the length 4, small blobs 26 of glue are applied as specific intervals, whereafter a single seed 10 is placed in each blob of glue. Subsequently, a further length 5 of material is advanced over the length 4 in such a manner that together with said length 4 the length 5 surrounds the seeds 10. Striped 23 of adhesive are applied on and transverse to the bottom side of the length 5 at intervals corresponding to the intervals between the seeds 10 on the length 4. By adjusting the two lengths 4, 5 relative to one another in the longitudinal direction thereof, the stripes 23 with adhesive are placed in the middle between the seeds 10, whereafter the two lengths are pressed together at least opposite the stripes 23 with adhesive by means of rolls 27, and the adhesive is dried and optionally cured by means of radiant heat 28 before the tape is coiled up into a packaged tape 20. The resulting tape is of the king shown in FIG. 5 with adjacent pockets 2 separated only by the adhesive stripes 23. It is, however, also possible by this process to produce a tape of the kind shown in FIG. 1 by placing the stripes 23 with adhesive in pairs at a spacing corresponding to the with of each pocket 2 and at a spacing between the stripes 23 in pairs corresponding to the spacing between the succeeding pockets 2 in the tape 1.

FIG. 8 is also a diagrammatic view of a process, which in principle does not differ essentially from the above process of FIG. 7. The only difference is that the upper length 5 of material of FIG. 7 has been replaced by sheetshaped strips 22 of material with stripes 23 of adhesive on their bottom surface along the two opposing side edges in the transverse direction of the tape. Upon application of the glue blobs 26 and the placing of the seeds 10, the strips 22 of material are positioned over the seeds with a stripe 23 of adhesive on each side of the seed in the longitudinal direction of the tape. Subsequently, the strips 22 of material are pressed firmly onto the length 4, and the adhesive is dried and optionally cured by means of radiant heat 28. In a special embodiment of the tape, the stripe 23 of adhesive is only placed as a stripe on one side of the seed 10, thereby leaving the pocket 2 open to the other side of the seed beyond being open at the top and the bottom side. Finally the tape 1 is coiled up into a packaged tape 20 like that of FIG. 2.

Though the specific description refers only to tapes with seeds, and to a process for producing such tapes, many other viable plant materials can also in principle be used in producing these tapes merely by a suitable modification of the process, especially as regards the means to be used (not shown) in the transfer of plant material to the tape.

I claim:

1. A tape or packaged tape provided along the length thereof with pockets disposed transversely to the tape and with a desired spacing, said pockets containing viable plant material selected from the group consisting of seeds, other kinds of sproutable germs, cuttings, meristems, and tissue culture, said plant material being fixed thereto and intended for development into seedlings or beddingplants within the packaged tape before being transplanted as a continuous tape, said pockets comprising a first thin layer and a second thin layer of wallforming materials being fixed to each other at intervals, and wherein said walls of the pockets are adapted to enable the necessary supply and regulation of air and water for the development of the plant material inside the tape without the coexistence of any further growth medium thereabout, at least one of the layers being adapted to prevent the roots of the plants from penetrating through said layer upon the development of said plant material, and at least one of the layers being adapted to secure the plants inside the pockets by allowing the roots to penetrate into or adhere to said layer, said pockets further being open at the top and bottom thereof, the tape including the pockets and the viable plant material being quite flat and bendable, windable spirally and foldable flat upon itself into a package, the tape in the longitudinal direction further having a tensile strength of at least one Newton at the time of transplantation, enabling it to stand a mechanical treatment including a fully automatic transplantation of the tape by pulling it out from a spirally wound or folded package and leading it down into the soil.

2. A tape as in claim 1, wherein said tape comprises a length of tape material forming the first of said two thin layers of the pockets containing the plant material, said length having the desired tensile strength of the tape and being impenetrable to the roots of the plants, the second layer of said pockets being fixed to said first layer and being formed as strips of a material penetrable to the roots of the plants.

3. A tape as in claim 2, wherein the material of the first thin layer of the pockets is a paper coated on one side (the outer side) thereof with a plastic membrane, and the second thin layer of the pockets is a porous paper.

4. A tape as in claim 5, wherein the tape material comprises end sections of a length of at least 1.0 m, preferably at least 1.5 m without any pockets therein.

5. A tape as in claim 2, wherein the material of the first thin layer of the pockets is a fiber-reinforced paper coated on one side (the outer side) thereof with a wax layer, and the second thin layer of the pockets is a porous paper.

6. A tape as in claim 5, wherein the wax layer is a layer of small balls of wax, said layer being water-retaining though permeable to aqueous vapor and air.

7. A tape as in claim 2, wherein said stripe of the second layer of the pockets are fixed to the first layer of the pockets along one of their side edges transversely to the tape direction only, said pockets thereby being open to the other side and to the top and the bottom of the pocket.

8. A tape as in claim 1, wherein said tape comprises two lengths of tape material being fixed to each other with a desired spacing along the length thereof to provide the said pockets.

9. A tape as in claim 1, wherein the materials of said first and said second layer are selected from the group consisting of plastic film, paper, paper coated on one side thereof with a plastic membrane, paper coated on one side thereof with a wax, a fiber-reinforced material, a fiber-reinforced paper coated on one side thereof with a wax, a non-woven material, a non-woven material coated on one side thereof with a plastic membrane, a non-woven material coated on one side thereof with a wax, a layer of foamed synthetic resin coated on one side thereof with a plastic membrane, a layer of foamed synthetic resin coated on one side thereof with a wax, and a combination of said materials.

10. A tape as in claim 1, wherein additional replacement pockets containing viable plant material are fixed to the tape close to pockets without any plant material and pockets containing unsatisfactory or destroyed plant material.

11. A tape as in claim 10, wherein the said additional pockets are fixed to the tape by means of an adhesive, preferably by means of a wax layer or a plastic coating of the tape itself.

12. A tape as in claim 1, wherein the walls of said pockets comprise at least in part translucent material.

13. A tape as in claim 1, wherein the walls of said pockets comprise at least in part transparent material.

14. A process of producing a packaged tape as in claim 1, said tape being provided along the length thereof with pockets disposed transversely to the tape and with a desired spacing, said pockets containing viable plant materials selected from the group consisting of seeds, other kinds of sproutable germs, cuttings, meristems, and tissue culture, said plant material being fixed thereto and intended for development into seedlings or beddingplants within the packaged tape before being transplanted as a continuous tape, comprising insertion of the viable plant material at the desired spacing between two layers of wall-forming materials intended for the formation of the tape and the pockets, thereby fixing the viable plant material onto at least one of said two layers, fixing of said two layers to each other transversely to the tape and at the desired spacing, thereby forming said pockets about the viable plant material, and winding up or folding upon itself of said tape into a package of tape.

15. A process as in claim 14, wherein the first thin layer of wall-forming material is made of a continuous length of material at the same time forming the tape length, and the second thin layer of wall-forming material is in the form of strips, each strip forming the second wall of a pocket.

16. A process as in claim 15, wherein the material selected for the first wall-forming layer is a paper coated on one side thereof with a plastic membrane, and the material selected for the second wall-forming layer is in form of strips of porous paper.

17. A process as in claim 14, wherein the materials used for both wall-forming layers of the pockets form continuous lengths of the tape as well.

18. A process as in claim 17, wherein the pockets are disposed close to each other in the tape, and where before being packaged said tape is cut up into single pockets, which are then transferred and affixed to an additional supporting member with a greater spacing, thereby forming a new tape rolled up or folded upon itself into a package.

19. A process as in claim 14, wherein the materials used for both wall-forming layers are selected from the group consisting of plastic film, paper, paper coated on one side thereof with a plastic membrane, paper coated on one side thereof with a wax, a fiber-reinforced material, a fiber-reinforced paper coated on one side thereof with a wax, a non-woven material, a non-woven material coated on one side thereof with a plastic membrane, a non-woven material coated on one side thereof with a wax, a layer of foamed synthetic resin coated on one side thereof with a plastic membrane, a layer of foamed synthetic resin coated on one side thereof with a wax, and a combination of said materials.

20. A process as in claim 14, said process further comprising an inspection of said tape for pockets lacking plant material or containing a destroyed plant material, and fixing of additional pockets containing viable plant material on the outside of the tape close to said pockets.

* * * * *